United States Patent
Geltinger (10) Patent No.: US 11,420,377 B2
(45) Date of Patent: Aug. 23, 2022

(54) APPARATUS FOR FORMING PLASTIC PREFORMS INTO PLASTIC CONTAINERS, A BLOW MOULD AND A METHOD OF MANUFACTURING A CONTAINER

(71) Applicant: KRONES AG, Neutraubling (DE)

(72) Inventor: Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/734,015

(22) PCT Filed: Sep. 25, 2019

(86) PCT No.: PCT/EP2019/075857
§ 371 (c)(1),
(2) Date: Dec. 1, 2020

(87) PCT Pub. No.: WO2020/064834
PCT Pub. Date: Apr. 2, 2020

(65) Prior Publication Data
US 2021/0252766 A1    Aug. 19, 2021

(30) Foreign Application Priority Data

Sep. 25, 2018 (DE) ...................... 10 2018 123 624.7

(51) Int. Cl.
*B29C 49/54* (2006.01)
*B29C 49/48* (2006.01)
*B29L 31/00* (2006.01)

(52) U.S. Cl.
CPC ...... *B29C 49/54* (2013.01); *B29C 2049/4892* (2013.01); *B29L 2031/7158* (2013.01)

(58) Field of Classification Search
CPC ....................... B29C 2049/4892; B29C 49/54
See application file for complete search history.

(56) References Cited

U.S. PATENT DOCUMENTS 4,547,333 A    10/1985 Takada
5,122,327 A     6/1992 Spina et al.
(Continued)

FOREIGN PATENT DOCUMENTS

DE    102010039803    3/2012

OTHER PUBLICATIONS

German Search Report dated Jun. 12, 2019 issued in corresponding German Application No. 10 2018 123 624.7.
(Continued)

*Primary Examiner* — Robert B Davis
(74) *Attorney, Agent, or Firm* — Onello & Mello, LLP (57) ABSTRACT

Apparatus (1) for forming plastic preforms (10) into plastic containers (20), having at least one blow mould (14) which has at least two blow mould side parts (14a, 14b) and a bottom mould (14c), wherein the blow mould side parts (14a, 14b) and the bottom mould (14c) forming a cavity which corresponds to a negative contour of the plastic container (20) to be formed, wherein between the blow mould side parts (14a, 14b) and the bottom mould (14c) at least a first parting plane (22) and a second parting plane (24) is present, wherein the first parting plane (22) extending between the two side parts (14a, 14b) and the second parting plane (24) extending between the side parts (14a, 14b) and the bottom mould (14c), wherein the blow mould side parts (14a, 14b) and the bottom mould (14c) can be separated from each other by the second parting plane (24) and the bottom mould (14c) can be removed from the blow mould side parts (14a, 14b) by a bottom lift. According to the invention, at least a part of the bottom contour (15b) of the bottom mould (14c) is arranged in the blow mould side parts (14a, 14b).

17 Claims, 7 Drawing Sheets

(56) References Cited

U.S. PATENT DOCUMENTS

| | | |
|---|---|---|
| 5,968,560 A | 10/1999 | Briere et al. |
| 6,666,001 B2 | 12/2003 | Mero |
| 7,241,130 B2 | 7/2007 | Arakelyan |
| 8,403,660 B2 | 3/2013 | Stoiber |
| 9,744,712 B2 | 8/2017 | Letestu et al. |
| 10,518,465 B2 | 12/2019 | Derrien et al. |
| 2002/0070193 A1 | 6/2002 | Mero |
| 2006/0093699 A1 | 5/2006 | Arakelyan |
| 2012/0052149 A1 | 3/2012 | Stoiber |
| 2015/0298386 A1 | 10/2015 | Letestu et al. |
| 2017/0232656 A1 | 8/2017 | Derrien et al. |

OTHER PUBLICATIONS

International Search Report and Written Opinion dated Jan. 23, 2020 issued in corresponding International Application No. PCT/EP2019/075857.

APPARATUS FOR FORMING PLASTIC PREFORMS INTO PLASTIC CONTAINERS, A BLOW MOULD AND A METHOD OF MANUFACTURING A CONTAINER

The present invention relates to an apparatus for forming plastic preforms into plastic containers as well as a blow mould and a method for manufacturing a container. Such methods and apparatus have been known from the prior art for a long time. The plastic preforms are usually placed in a blow mould of a blowing machine, within which they are formed into plastic containers by applying a fluid medium, such as compressed air, and stretching them with a stretching rod by pressing the plastic preforms against the inner walls of the blow mould.

The blow mould usually consists of two side parts and a bottom mould, which form a cavity which is the shape of the plastic containers to be produced. After forming the plastic preforms into the plastic containers, it is necessary to remove them from the blow mould. For this purpose, the blow mould side parts are usually opened and the bottom mould is moved downwards.

The separation between the bottom mould and the blow mould side parts is currently always made at a tangent point where the curvature of the bottom contour intersects with a vertical, cylindrical outer surface of the container contour or the blow mould side parts. To demould (remove) the container, at least this bottom lift must be performed.

From a kinematic point of view and in terms of load, the bottom lift is the critical and performance-limiting variable in relation to the mechanical output of a blow-moulding machine. The lower the bottom lift, the lower the loads and the higher the output of the blow-moulding machine.

The object of the present invention is therefore reducing the bottom lift of the bottom mould of blow moulds, which is carried out in particular for demoulding and removing of the plastic container. According to the invention, this object is achieved by the subject matters of the independent claims. Advantageous embodiments and modifications are the subject matter of the sub-claims.

An apparatus according to the invention for forming plastic preforms into plastic containers has at least one blow mould which has at least two blow mould side parts and a bottom mould, wherein the blow mould side parts and the bottom mould form a cavity which corresponds to a negative contour of the plastic container to be formed and/or within which the plastic preforms can be formed into the plastic containers (which are in particular plastic bottles), wherein at least a first parting plane and a second parting plane are present between the blow mould side parts and the bottom mould, wherein the first parting plane extending between the two side parts and the second parting plane extending between the side parts and the bottom mould, wherein the blow mould side parts and the bottom mould being separable from one another by the second parting plane and the bottom mould being removable from the blow mould side parts by a bottom lift.

According to the invention, the second parting plane between the blow mould side parts and the bottom mould lies below a tangent point of the blow mould or the container, where a curvature of the bottom mould or a standing foot of the container intersects with a vertical cylindrical lateral surface of the blow mould side parts or the outer wall of the container.

In other words, the bottom mould is separated from the blow mould side parts below an area where a tangent applied to the bottom mould just becomes vertical. The vertical cylindrical lateral surface refers to an area in which the container still has a circumferential circular diameter without deviating from the circular shape due to the formation of the standing feet of the standing area of the container. Vertical is defined as a direction running in the longitudinal direction of the blow mould or plastic container in which the mouth area of the container is directed upwards.

Since the container and bottom contours are not to be changed, the invention proposes to set the separation between the bottom mould and the blow-mould side parts not at the tangent point described above, as is currently usual, but further below. In this way, a smaller mechanical bottom lift can be implemented without changing the contour. At the same time, the weight of the bottom mould is also reduced, which has an additional positive effect on the kinematics and performance.

This lower maximum bottom lift is in particular advantageous with regard to a higher output of the apparatus. The only side effect is the downward moving separating seam between the bottom and the side parts in the case of very large containers.

By lowering the parting plane between the bottom mould and the blow mould side parts, the blow mould is changed in particular so that part of the bottom contour is formed in the side parts.

The present invention is therefore also directed towards an apparatus for forming plastic preforms into plastic containers with at least one blow mould which has at least two blow mould side parts and a bottom mould, wherein the blow mould side parts and the bottom mould forming a cavity which corresponds to a negative contour of the plastic container to be formed and/or within which the plastic preforms can be formed into the plastic containers (which are in particular plastic bottles), wherein at least a first parting plane and a second parting plane are present between the blow mould side parts and the bottom mould, wherein the first parting plane extending between the two side parts and the second parting plane extending between the side parts and the bottom mould, wherein the blow mould side parts and the bottom mould being separable from one another by the second parting plane and the bottom mould being removable from the blow mould side parts by a bottom lift.

According to the invention, at least a part of the bottom contour of the bottom mould is located in the blow mould side parts. This is preferably achieved by lowering the second parting plane while maintaining the same container or blow mould contour. The part of the bottom contour which is arranged in the blow mould side parts is preferably a section which forms the standing area or the standing feet of the container. In particular, this is an area of the container in which a geometric tangent is applied to this area (when the container is standing upright) does not yet run vertically.

The shape of the bottom mould preferably forms the contour of the bottom of the container. The bottom mould particularly preferably forms the standing area or the standing feet of the container. The formed container preferably have at least two standing feet, preferably at least four standing feet, and particularly preferably five standing feet. Preferably, the container have a maximum of 12, preferably a maximum of 10, and particularly preferably a maximum of 8 standing feet.

Accordingly, the bottom mould preferably has a contour which forms at least two standing feet, preferably at least four standing feet, and particularly preferably five standing feet of the container. A centre is preferably located in the middle of the bottom mould, starting from a surface on which the container stands, higher than the standing areas of the container resting on this surface. Furthermore, the standing feet preferably have a curvature.

The blow-mould side parts accordingly preferably form a contour of an outer wall or a base body of the container. Furthermore, the formed plastic container preferably has a support ring and a mouth area arranged above the support ring. This mouth area includes a thread for a closure. The mouth area already has its final shape in the plastic preform and is therefore not further formed.

When forming the plastic preform into the plastic container, the preform is preferably pressed against the negative contour of the blow mould to obtain the desired shape. In particular the second parting plane between the blow mould side parts and the bottom mould is visible on the finished container.

The above-mentioned separation or removal of the bottom mould from the blow mould side parts is particularly necessary in order to demould the formed plastic container and remove it from the blow mould. Preferably, the two side parts of the blow mould are opened first and then the bottom part is moved downwards. The bottom lift of the bottom part is preferably carried out vertically and preferably away from the standing area of the container. The container is arranged in the blow mould in such a way that the mouth area of the container protrudes upwards. The bottom lift and/or a movement of the bottom part is preferably carried out at least over a distance corresponding to the height of the bottom part.

The present invention is further directed towards an apparatus for forming plastic preforms into plastic containers with at least one blow mould which has at least two blow mould side parts and a bottom mould, wherein the blow mould side parts and the bottom mould forming a cavity which corresponds to a negative contour of the plastic container to be formed and/or within which the plastic preforms can be formed into the plastic containers (which are in particular plastic bottles), wherein at least a first parting plane and a second parting plane are present between the blow mould side parts and the bottom mould, wherein the first parting plane extending between the two side parts and the second parting plane extending between the side parts and the bottom mould, wherein the blow mould side parts and the bottom mould being separable from one another by the second parting plane and the bottom mould being removable from the blow mould side parts by a bottom lift.

According to the invention, the blow mould is a blow mould with which containers with a round cross-section can be produced and the bottom mould has a cross-section deviating from a round cross-section when viewed from above. This cross-section deviating from the round cross-section is also achieved in particular by lowering the second parting plane while maintaining the same container or blow mould contour.

The apparatus for forming plastic preforms into plastic containers according to the invention is preferably a blow moulding machine. This means that the plastic preforms are first thermally conditioned in a heating section and then expanded by application of a liquid or gaseous medium.

The flowable medium is preferably under pressure. For the supply of the pressurised medium, the apparatus has a blowing nozzle which can be sealingly placed against a mouth of the plastic preforms to expand the plastic preforms with liquid or gaseous medium. In addition, a valve arrangement is preferably also provided, which controls the supply of the blowing air to the plastic preforms. However, it is also preferable that the expansion of the container takes place by means of the product, so that simultaneous filling and expansion of the container is carried out.

Preferably, the blow-moulding machine is a stretch blow-moulding machine, which means that the preforms are stretched in longitudinal direction by means of a stretching rod before and/or during expansion. The blow stations are equipped in each case with stretching rods which can be inserted into the plastic preforms and stretch the plastic preforms in their longitudinal direction. The stretching rods are preferably equipped with a drive, in particular an electric (but also hydraulic or pneumatic) drive. However, it is also conceivable to control the stretching rods via curves.

In an advantageous embodiment, a plurality of blow stations or blow moulds are arranged on a common movable carrier. This carrier is in particular a rotatable carrier. The blow stations each have a blow moulding device, which preferably form a cavity within which the plastic preforms can be expanded to form the plastic containers. These blow moulding units are preferably designed in several parts and have two blow mould side parts and a bottom mould.

Preferably, these blow mould side parts are detachably mounted on a mould carrier shell or on the blow mould carriers. The blow mould carriers can be pivoted relative to each other to open and close the blow mould devices. In addition, the blow mould carrier has locking mechanisms to lock the mould halves together during the blowing process.

The blow-moulding machine, or rather the carrier and the blow-moulding arrangements, is/are located within a clean room, which separates the blow-moulding machine from a nonsterile environment. Drive devices for closing, locking and/or opening the blow moulds are preferably located outside the clean room.

The blow moulding devices are preferably transported within the clean room. The clean room is preferably limited by several walls. Preferably, the clean room is limited by at least one stationary wall and one wall moving with respect to this stationary wall. In particular, the clean room separates the blow moulds from a non-sterile environment. The clean room is advantageously designed in a ring or toroidal shape around the blowing stations or forming stations and/or the transport path of the plastic containers.

In a preferred embodiment, the second parting plane runs preferably in a horizontal direction between the blow mould side parts and the bottom mould. A horizontal direction means that the second parting plane is preferably perpendicular to a longitudinal direction of the container arranged in the blow mould, in which the mouth area of the container projects upwards or is directed upwards.

In a further preferred embodiment, the first parting plane runs preferably in a vertical direction between the two blow-mould side parts. A vertical direction is understood to mean that the first parting plane preferably runs in the longitudinal direction of the container arranged in the blow mould, in which the mouth area of the container projects upwards or is directed upwards. The blow mould side parts are preferably arranged so that they can swivel relative to each other for opening and closing the blow mould.

Particularly preferred, the first parting plane and the second parting plane are arranged perpendicular to each other and in particular arranged at an angle of exactly 90° to each other.

In a further preferred embodiment, the height of the bottom lift corresponds at least to the height of the bottom mould. The height of the bottom mould is understood to be the area in which the bottom contour of the container is arranged or the area of the bottom mould which shapes the standing area of the container. Possibly areas of the bottom mould located below this area are not counted as part of the height of the bottom mould.

In a further preferred embodiment, the height of the bottom mould and/or the second parting plane is less than half of a container diameter of a container produced with the apparatus. Preferably, the height of the second parting plane corresponds to the height of the bottom mould. The height of the second parting plane can be calculated, preferably based on a standing circle of the container, using the following formula:

$$Height_{Parting\ line} < \frac{Container\ diameter}{2}.$$

In a further advantageous embodiment, the blow-mould diameter is preferably greater than or equal to 150 mm, preferably greater than or equal to 140 mm and particularly preferably greater than or equal to 125 mm. Here, the blow mould diameter refers in particular to the outer circumference of the blow mould. With a blow mould diameter smaller than 125 mm, it is not absolutely necessary to reduce the bottom lift, since here the bottom mould already has a comparatively low height and a correspondingly lower bottom lift has to be performed, however, it also conceivable to reduce the bottom lift by such blow mould diameters.

In a further preferred embodiment, the height of the bottom mould for a container diameter of 105 mm is preferably between 51 mm and 30 mm, preferably between 51 mm and 32 mm, and particularly preferably between 51 mm and 35 mm. Preferably, the container diameter is also the outer circumference of the container. On this exemplary container, the bottom lift of currently 51 mm, measured from the lower bottom edge to the parting plane, can therefore be reduced to 40 mm and preferably to 35 mm.

It should be noted that a container with a diameter of 105 mm has been given as an example only to illustrate the reduction of the bottom lift. It goes without saying that the apparatus according to the invention can therefore achieve a considerable reduction of the bottom lift even for containers with a diameter of more or less than 105 mm. It is therefore preferred that the apparatus according to the invention reduces the height of the bottom mould and/or the second parting plane and/or the height of the bottom lift by at least 41%, preferably by at least 37% and particularly preferably by at least 32%.

In a further advantageous embodiment, a cut surface of the bottom mould comprises an undercut in the top view. The invention therefore specifically proposes to move the separation or the second parting line downwards until the cut surface of the bottom mould considered in the top view creates an undercut when separating the blow mould parts. This means that the bottom mould does not have a round cross-section in the top view. The undercut is preferably created by the shape of the standing feet formed in the bottom mould.

The present invention is furthermore also directed towards a blow mould for an apparatus according to the invention for forming plastic preforms into plastic containers, which has at least two blow mould side parts and a bottom mould, wherein the blow mould side parts and the bottom mould forming a cavity which corresponds to a negative contour of a plastic container to be formed, wherein the bottom mould forming a contour of the container and in particular a standing area of the container and the blow mould side parts forming a contour of the outer wall of the container.

According to the invention, at least a part of the bottom contour of the bottom mould is arranged in the blow mould side parts and/or the blow mould is a blow mould with which containers with a round cross-section can be produced and the bottom mould has a cross-section deviating from a round cross-section in a top view.

Accordingly, the blow mould according to of the invention also serves to reduce the height of the bottom lift by lowering the height of the bottom mould and/or reducing the height of the second parting plane. The part of the bottom contour which is arranged in the blow mould side parts is preferably a section which forms the standing area or the standing feet of the container. This is preferably achieved by lowering the second parting plane while maintaining the same container or blow-mould contour. The cross-section deviating from the round cross-section is also achieved or created by lowering the second parting plane while maintaining the same container or blow-mould contour.

Channels for temperature control of the blow mould are preferably arranged in the blow mould side parts and/or the bottom mould. These channels are preferably supplied with tempered water or tempered air.

The present invention also relates to a method for producing a container with at least one blow mould according to the invention.

It is therefore also proposed, on the method side, to reduce the height of the bottom lift by lowering the height of the bottom mould and/or reducing the height of the second parting plane.

In the method for producing the containers, plastic preforms are preferably stretched in the longitudinal direction inside the blow mould with a stretching rod and then applied with a gaseous medium, such as compressed air in particular, whereby the container is pressed against the contour of the blow mould and assumes its shape.

After forming the containers, the blow mould side parts are preferably opened by swivelling and the blow mould side parts and the bottom mould are separated from each other by removing the bottom mould from the blow mould side parts by a bottom lift. The container is demoulded by the bottom lift and the finished container can be removed from the blow mould.

The container can be removed either manually by an operator or automatically by a gripper device and/or a discharge unit following the blow moulding machine.

Further advantages and embodiment are shown in the attached drawings.

Figure 1:
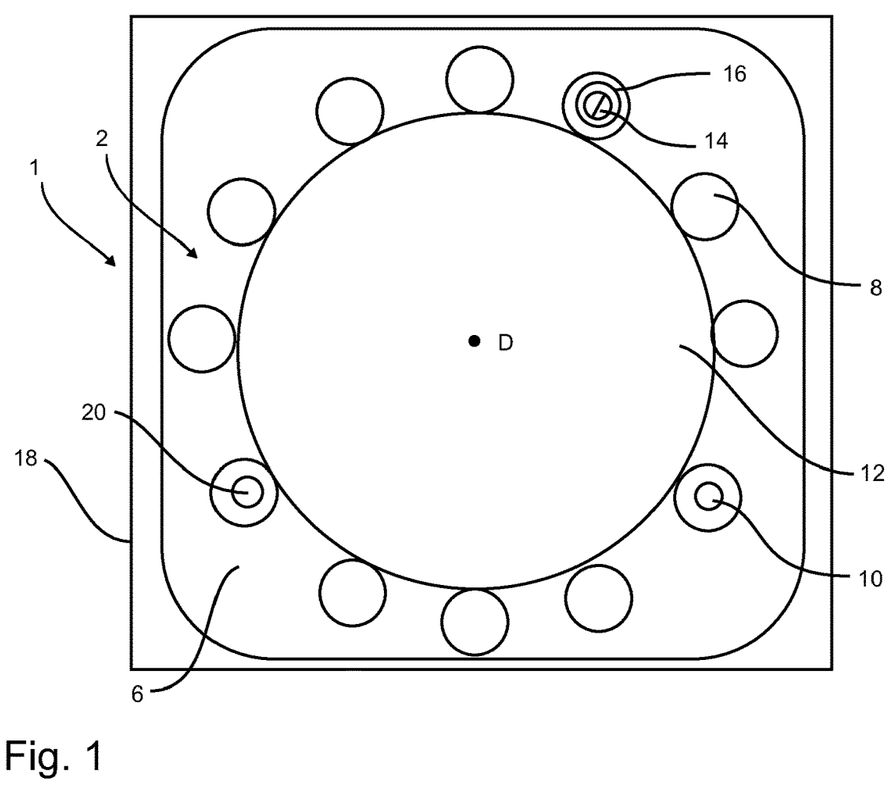
FIG. 1 shows a schematic representation of an apparatus according to the invention for forming plastic preforms into plastic containers.

FIG. 1 shows a schematic representation of an apparatus 1 for forming plastic preforms 10 into plastic containers 20. In the case the plastic preforms 10 are fed to the individual forming stations 8 and, preferably while they are being transported by a transport device 2, expanded into plastic containers 20. After this expansion, the plastic containers 20 are taken out of the apparatus 1 again. For this purpose a (not shown) feeding star can be provided, which feeds the plastic preforms to the apparatus 1, as well as a (also not shown) discharge device, in particular also a transport starwheel, which discharges the finished plastic containers 20 from the apparatus again.

The apparatus 1 has a station carrier 12 on which a plurality of forming stations 8 are arranged. This station carrier can be, for example, as shown in FIG. 1, a blowing wheel which can be rotated in relation to an axis of rotation D (which here is perpendicular to the plane of the figure and thus vertical). Each individual forming station 8 is equipped with a blow mould 14, which consists of two blow mould side parts 14a, 14b and a bottom mould 14c. The blow moulds 14 are arranged on blow mould carriers 16 and can be removed from or placed on them.

The reference sign 6 indicates a base support on which the station support 12 is rotatably mounted. The reference sign 18 indicates a housing which at least partially surrounds the station carrier 12. Preferably the housing 18 separates its interior, which is designed as a sterile or clean room, from a normal atmosphere.

Figure 2A:
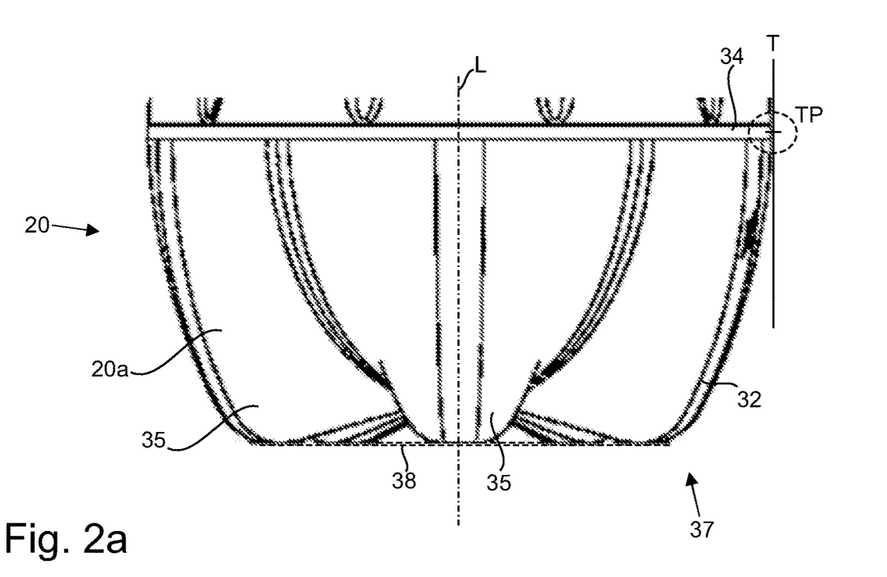
FIG. 2a shows a schematic representation of a bottom area of a container.
Figure 2B:
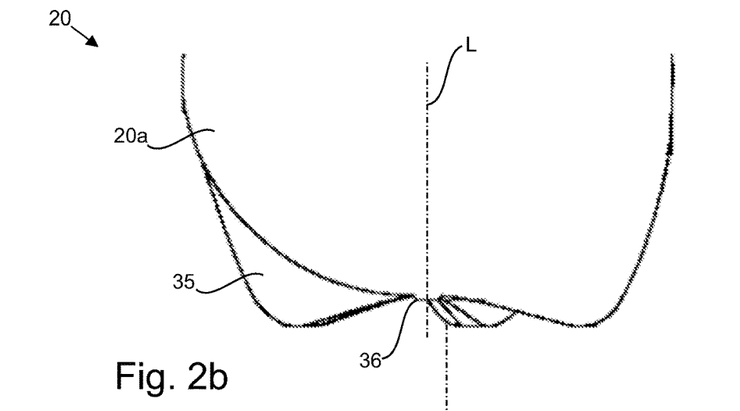
FIG. 2b shows a further schematic representation of a bottom area of a container.

FIGS. 2a and 2b each show a schematic representation of a bottom area 20a and a standing area 37 of a container 20, respectively. In particular, the standing feet 5 formed by the container 20 can be recognised, wherein the container 20 shown in this figure preferably has five standing feet 5. The reference sign 36 identifies the centre of container 20, which preferably, starting from a surface on which the container is standing, is higher than a standing circle 38 of the bottom area 20a indicated by the dotted area. This standing circle 38 lies on the surface on which the container stands.

The reference sign TP indicates a tangent point in which the second parting plane is located in the prior art. In particular, the tangent point TP in particular is a point at which a curvature 32 of a standing feet 35 or a bottom part intersects with a vertical cylindrical lateral surface 34 of the container or the side parts, or a point at which a tangent T, which is indicated here schematically, becomes just vertical. From this illustration, it is in particular clear that if this point of separation is set downwards, the lateral surface already has a diameter deviating from a circular shape, since here the standing feet 35 of the standing area 37 are formed here.

Figure 3A:
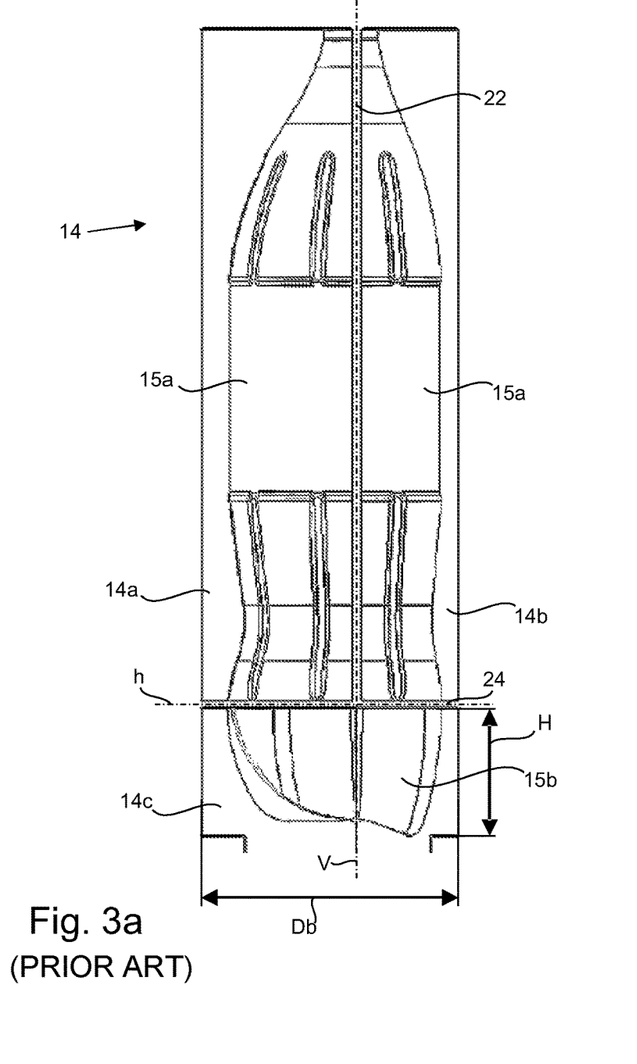
FIG. 3a shows a schematic representation of a blow mould according to the prior art.

FIG. 3a shows a schematic representation of a blow mould 14 according to the prior art. The blow mould 14 shown here has two blow mould side parts 14a and 14b and a bottom mould 14c. The blow mould side parts 14a, 14b form a contour 15a of the container 20 and the bottom mould 14c a bottom contour 15b of the container 20. The reference sign 22 indicates a first parting plane between the blow mould side parts 14a, 14b and the reference sign 24 indicates a second parting plane between the blow mould side parts 14a, 14b and the bottom mould 14c. The first parting plane 22 preferably runs in vertical direction v and the second parting plane 24 in horizontal direction h.

The reference sign H indicates the height of the bottom mould 14c, which in this illustration is in the area explained in FIG. 2. The reference sign Db also indicates the blow mould diameter of the blow mould 14.

Figure 3B:
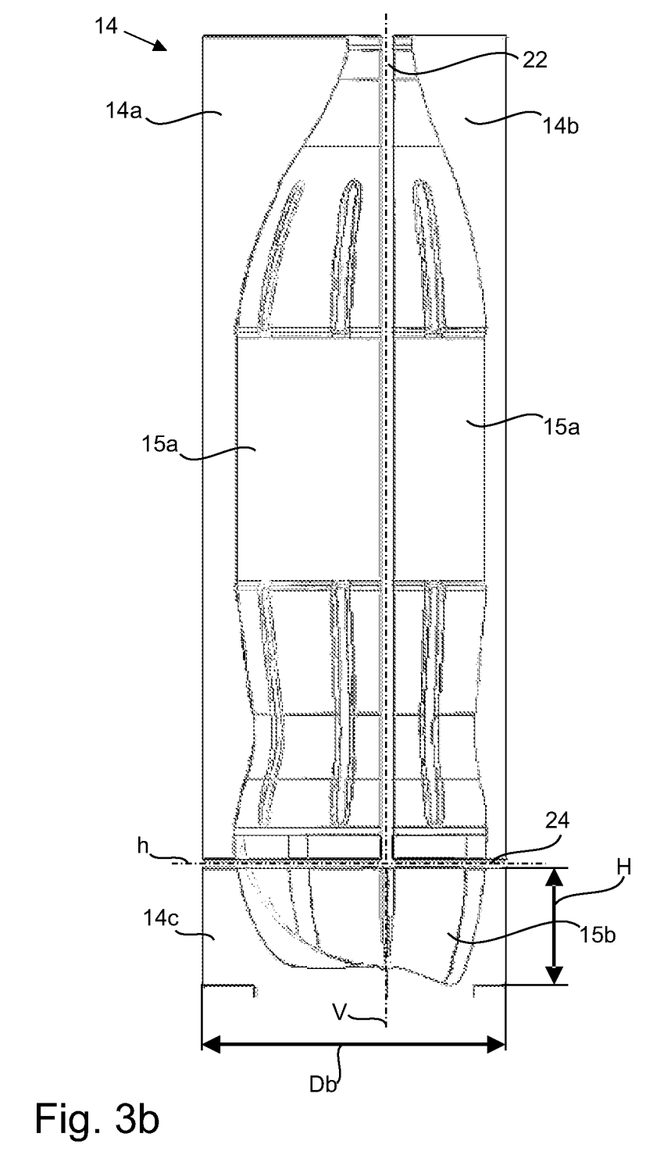
FIG. 3b shows a schematic representation of a blow mould according to the invention.

FIG. 3b shows a schematic representation of a blow mould 14 according to the invention. In this case it is in particular visible that the height H of the bottom mould 14c is considerably less than the height H of the bottom mould 14c in FIG. 3a. In particular, the height H of the bottom mould 14c is below the area explained in FIG. 2.

Figure 4A:
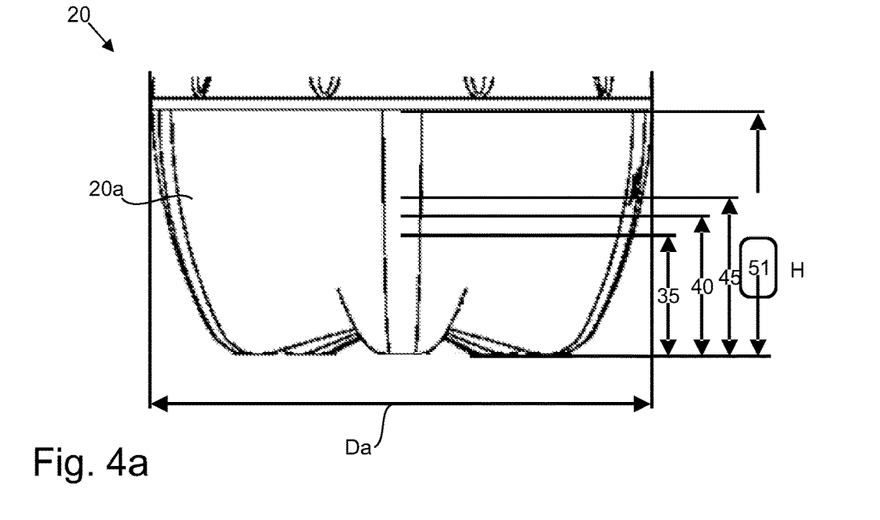
FIG. 4a shows a schematic representation of a bottom area of a container.
Figure 4B:
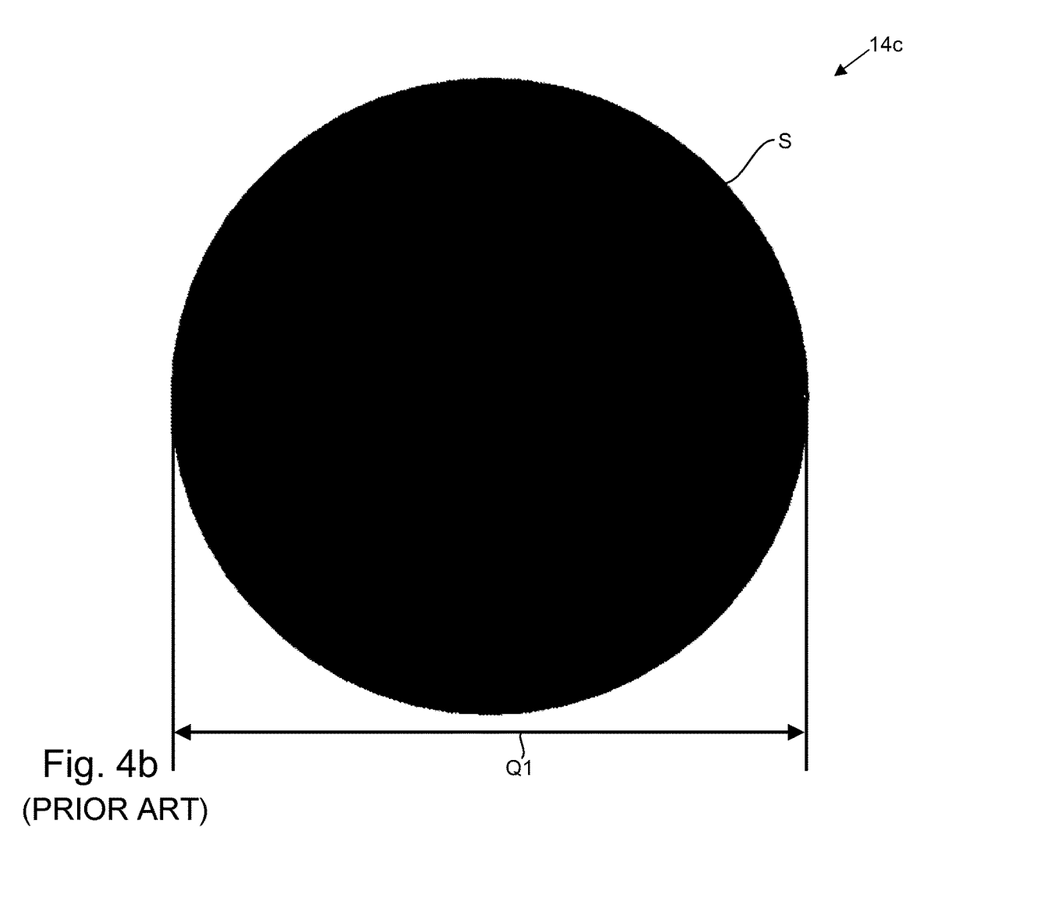
FIG. 4b shows a top view of a bottom mould according to the prior art.

FIG. 4a shows a schematic representation of a bottom section 20a of a container 20. This is in particular a bottom section 20a with a height H of 51 mm. In this exemplary design, it is a container 20 manufactured according to the prior art, the bottom height H of which corresponds to half the container diameter Da. FIG. 4b further shows a top view of a bottom mould 14c according to the prior art. It can be seen that the cut surface S of the bottom mould 14c has a round cross-section Q1.

Figure 5A:
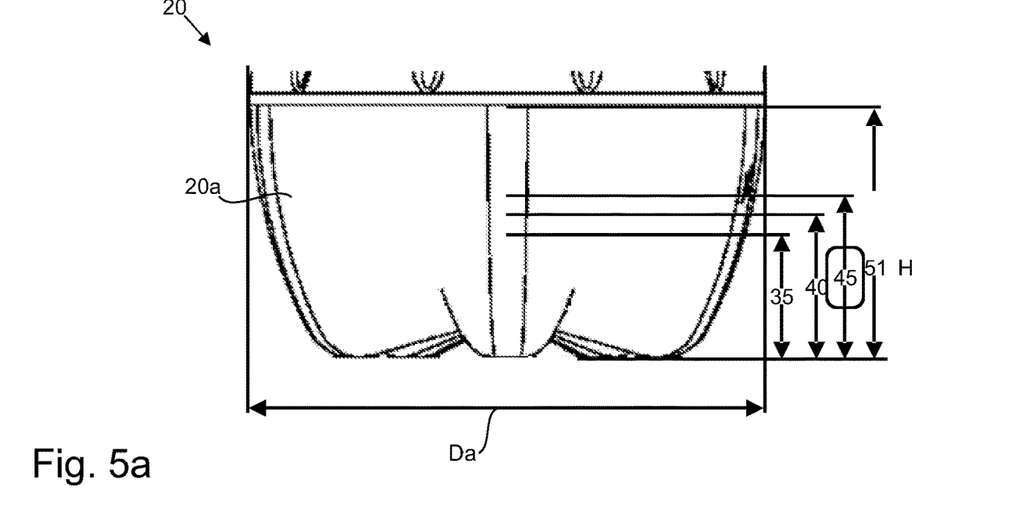
FIG. 5a shows a further schematic representation of a bottom area of a container.
Figure 5B:
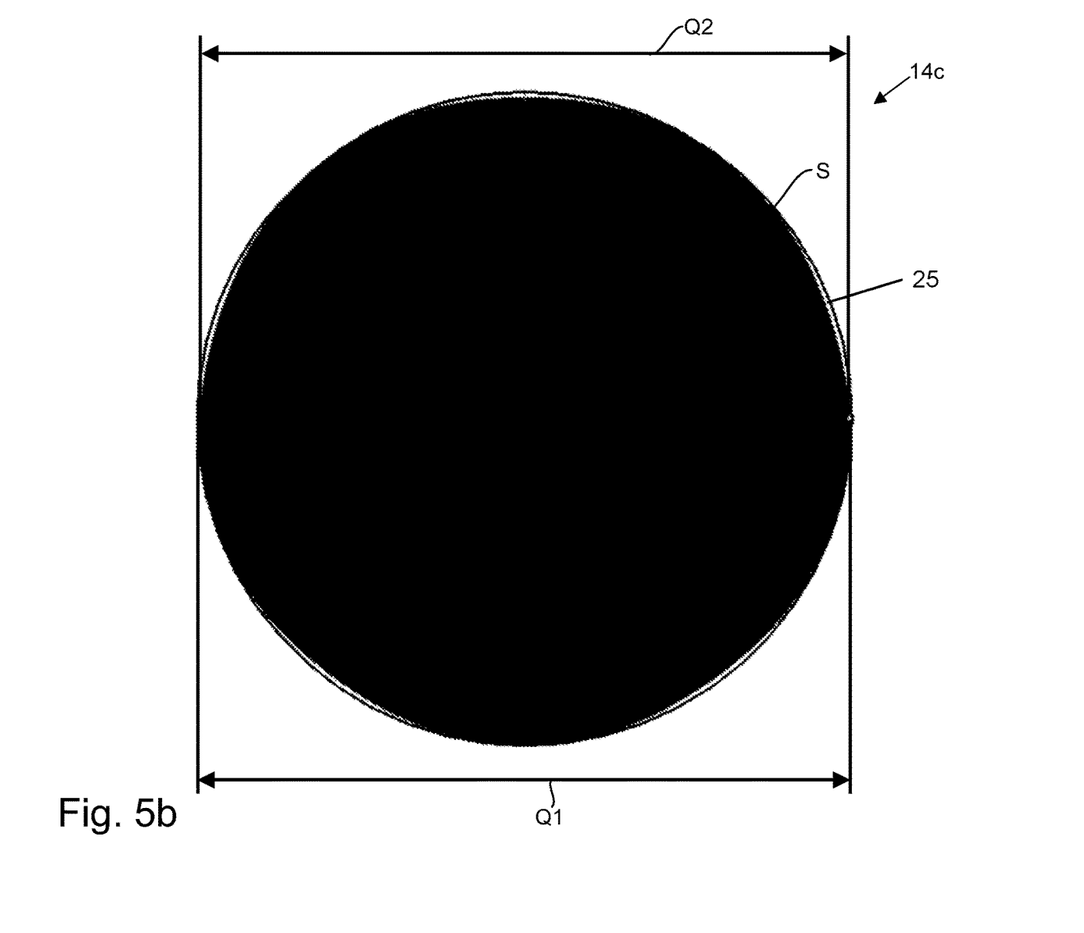
FIG. 5b shows a top view of a bottom mould according to the invention.

FIG. 5a shows a further schematic representation of a bottom area 20a of a container 20 produced with a blow mould 14 according to the invention and FIG. 5b shows a top view of a bottom mould 14c according to the invention. In the case of the exemplary container 20 shown in FIG. 5a, it is indicated that the height H of the bottom mould 14c has been reduced from 51 mm to 45 mm. In particular, the illustration in FIG. 5b makes it clear that due to such a reduction, the bottom mould 14c in a top view now has a cross-section Q2 deviating from the round cross-section Q1 instead of the previously round cross-section Q1.

Figure 6A:
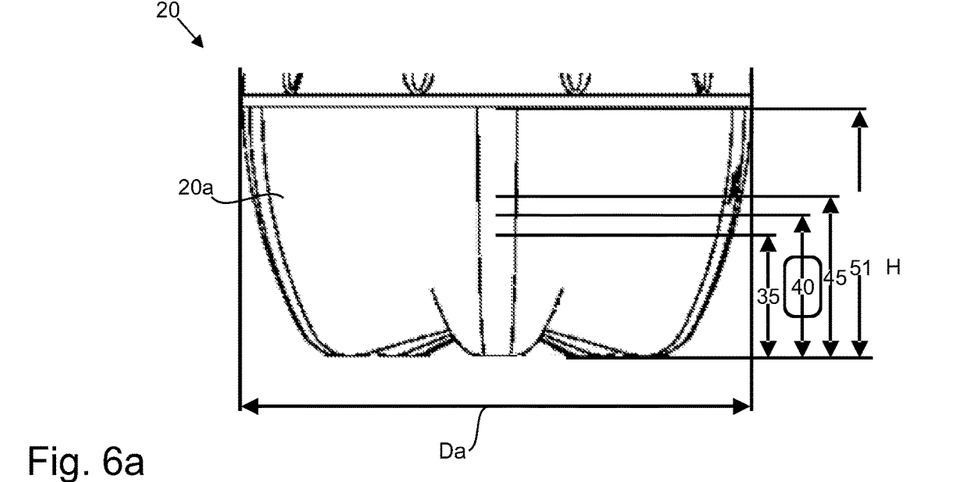
FIG. 6a shows a further schematic representation of a bottom area of a container.
Figure 6B:
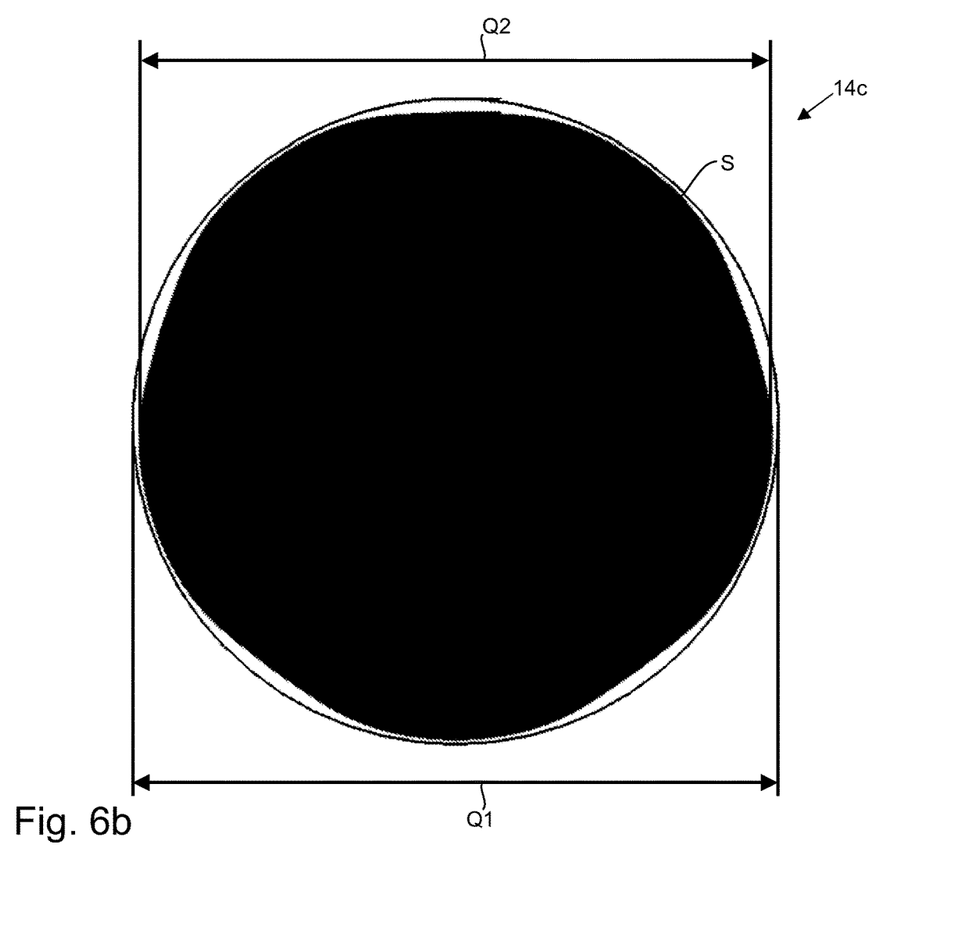
FIG. 6b shows a top view of a further bottom mould according to the invention.

FIGS. 6a and 6b show a further schematic representation of a bottom area 20a of a container 20 produced with a blow mould according to the invention, and again a top view of another bottom mould 14c according to the invention. In this exemplary embodiment, the height H of the bottom mould 14c was reduced from 51 mm to 40 mm. The cross-section Q2 of the top view of the bottom mould 14c deviates even further from a round cross-section Q1 than the bottom mould according to FIGS. 5a and 5b. The cut surface S also has an undercut 25, which is formed due to the cross-section Q2 of the bottom mould deviating from the round cross-section Q1.

Figure 7A:
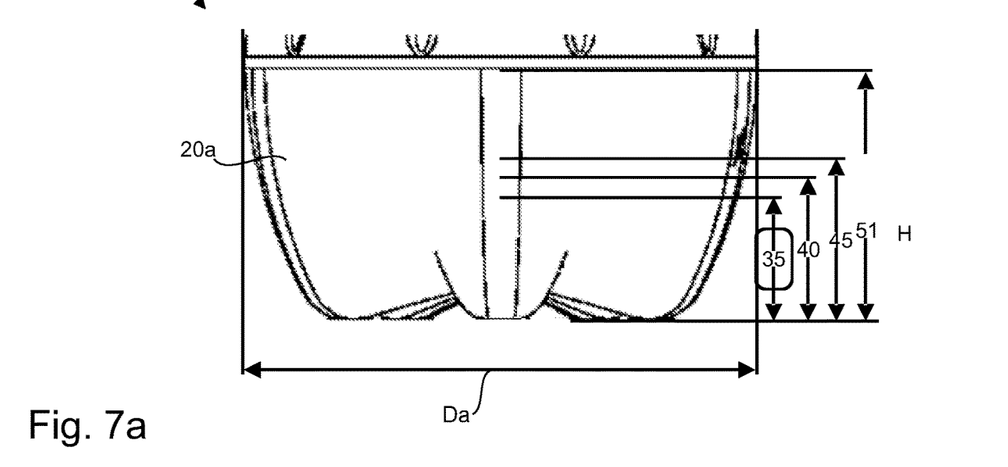
FIG. 7a shows a further schematic representation of a bottom area of a container.
Figure 7B:
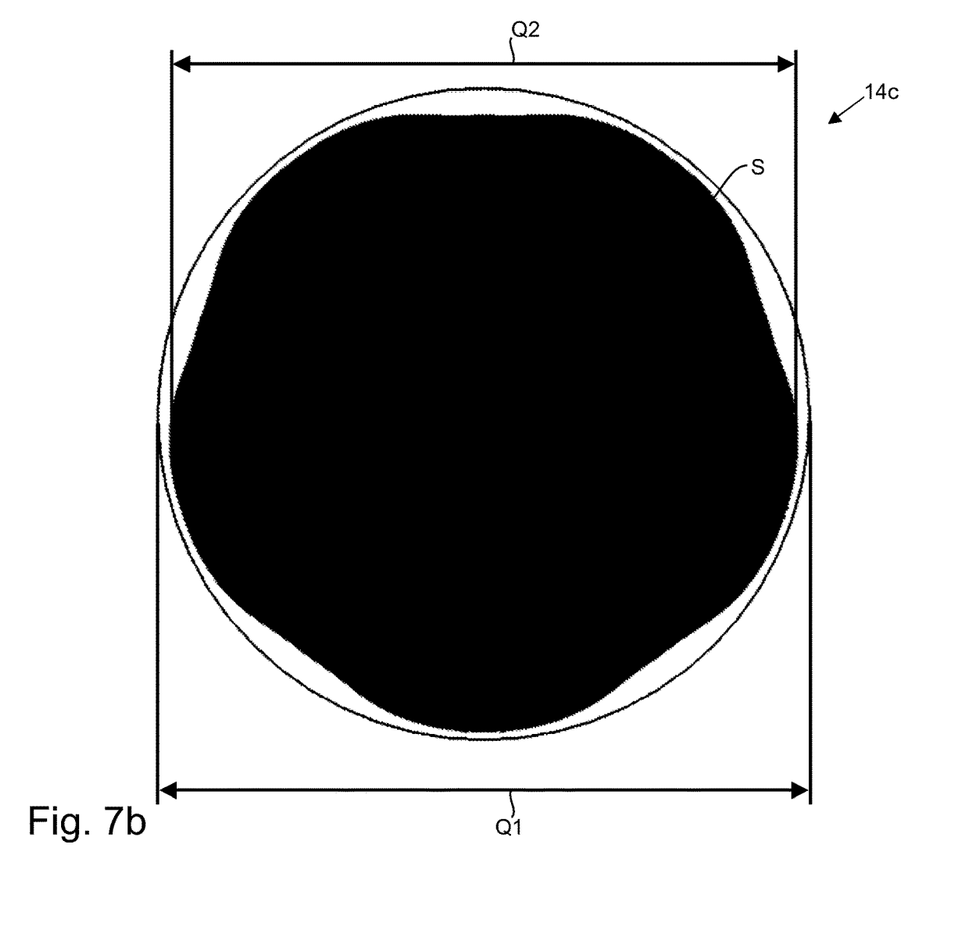
FIG. 7b shows a top view of a further bottom mould according to the invention.

FIGS. 7a and 7b show a further version of the bottom section 20a of container 20 or the bottom section 14c in which the height H of the bottom mould 14c has been reduced from 51 mm to 35 mm.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS 1 apparatus
2 transport device 6 base carrier
8 forming station
10 plastic preforms
12 station carrier
14 blow mould
14a, 14b blow mould side parts
14c bottom mould
15a contour of the container 20
15b bottom contour of the container 20
16 blow mould carrier
18 housing
20 plastic containers
20a bottom area of the container 20
22 first parting plane
24 second parting plane
25 undercut
30 standing area
32 curvature of the bottom mould 14c/standing feet 35
34 vertical cylindrical lateral surface
35 standing foot
36 centre
37 standing area
38 standing circle
D axis of rotation
Da container diameter
Db blow mould diameter
H height of bottom mould 14c and/or second parting plane 24
Q1 round cross-section
Q2 cross section
S interface
T tangent
TP tangent point
h horizontal direction
v vertical direction

The invention claimed is:

1. Apparatus for forming plastic preforms into plastic containers, having at least one blow mould which has at least two blow mould side parts and a bottom mould, wherein the blow mould side parts and the bottom mould forming a cavity which corresponds to a negative contour of the plastic container to be formed, wherein between the blow mould side parts and the bottom mould at least a first parting plane and a second parting plane is present, wherein the first parting plane extending between the two side parts and the second parting plane extending between the side parts and the bottom mould, wherein the blow mould side parts and the bottom mould can be separated from each other by the second parting plane and the bottom mould can be removed from the blow mould side parts by a bottom lift, characterised in that at least a part of the bottom contour of the bottom mould is arranged in the blow mould side parts and a cut surface of the bottom mould has an undercut in the top view.

2. Apparatus according to claim 1, characterised in that the second parting plane runs in a horizontal direction between the blow mould side parts and the bottom mould.

3. Apparatus according to claim 1, characterised in that the first parting plane runs in a vertical direction between the two blow mould side parts.

4. Apparatus according to claim 1, characterised in that the height of the bottom lift corresponds at least to the height of the bottom mould.

5. Apparatus according to claim 1, characterised in that the height of the bottom mould and/or the second parting plane is less than half a container diameter of a container produced with the apparatus.

6. Apparatus according to claim 1, characterised in that the blow-mould diameter is greater than or equal to 150 mm.

7. Apparatus according to claim 1, characterised in that the height of the bottom mould for a container diameter of 105 mm is between 51 mm and 30 mm.

8. A blow mould for an apparatus according to claim 1, comprising at least two blow mould side parts and a bottom mould, wherein the blow mould side parts and the bottom mould form a cavity, which corresponds to a negative contour of a plastic container to be moulded, wherein the bottom mould forms a contour of the container and including a standing area of the container and the blow mould side parts form a contour of the outer wall of the container, characterised in that at least a part of the bottom contour of the bottom mould is arranged in the blow mould side parts and/or the blow mould is a blow mould with which containers with a round cross-section can be produced and the bottom mould has a cross-section deviating from a round cross-section in a top view.

9. Apparatus for forming plastic preforms into plastic containers, having at least one blow mould which has at least two blow mould side parts and a bottom mould, wherein the blow mould side parts and the bottom mould forming a cavity which corresponds to a negative contour of the plastic container to be formed, wherein between the blow mould side parts and the bottom mould at least a first parting plane and a second parting plane is present, wherein the first parting plane extending between the two side parts and the second parting plane extending between the side parts and the bottom mould, wherein the blow mould side parts and the bottom mould can be separated from each other by the second parting plane and the bottom mould can be removed from the blow mould side parts by a bottom lift, characterised in that the blow mould is a blow mould with which containers with a round cross-section can be produced, and the bottom mould has a cross-section deviating from a round cross-section when viewed from above.

10. Apparatus according to claim 9, characterised in that the second parting plane runs in a horizontal direction between the blow mould side parts and the bottom mould.

11. Apparatus according to claim 9, characterised in that the first parting plane runs in a vertical direction between the two blow mould side parts.

12. Apparatus according to claim 9, characterised in that the height of the bottom lift corresponds at least to the height of the bottom mould.

13. Apparatus according to claim 9, characterised in that the height of the bottom mould and/or the second parting plane is less than half a container diameter of a container produced with the apparatus.

14. Apparatus according to claim 9, characterised in that the blow-mould diameter is greater than or equal to 150 mm.

15. Apparatus according to claim 9, characterised in that the height of the bottom mould for a container diameter of 105 mm is between 51 mm and 30 mm.

16. Apparatus according to claim 9, characterised in that a cut surface of the bottom mould has an undercut in the top view.

17. A blow mould for an apparatus according to claim 9, comprising at least two blow mould side parts and a bottom mould, wherein the blow mould side parts and the bottom mould form a cavity, which corresponds to a negative contour of a plastic container to be moulded, wherein the bottom mould forms a contour of the container and including a standing area of the container and the blow mould side parts form a contour of the outer wall of the container, characterised in that at least a part of the bottom contour of the bottom mould is arranged in the blow mould side parts and/or the blow mould is a blow mould with which containers with a round cross-section can be produced and the bottom mould has a cross-section deviating from a round cross-section in a top view.

* * * * *